US012751881B2

(12) United States Patent
Zhang

(10) Patent No.: US 12,751,881 B2
(45) Date of Patent: Oct. 6, 2026

(54) MOBILE HYPERBARIC HYDROGEN-OXYGEN SYSTEM

(71) Applicant: Hongkai Zhang, Shanghai (CN)

(72) Inventor: Hongkai Zhang, Shanghai (CN)

( * ) Notice: Subject to any disclaimer, the term of this patent is extended or adjusted under 35 U.S.C. 154(b) by 456 days.

(21) Appl. No.: 18/544,260

(22) Filed: Dec. 18, 2023

(65) Prior Publication Data

US 2025/0017799 A1 Jan. 16, 2025

(51) Int. Cl.
*A61G 10/02* (2006.01)

(52) U.S. Cl.
CPC ........ *A61G 10/026* (2013.01); *A61G 2220/14* (2013.01)

(58) Field of Classification Search
CPC . A61G 10/00–04; A61G 2220/14; A61G 3/00
USPC .......................... 128/202.12, 205.26; 600/21
See application file for complete search history.

(56) References Cited

U.S. PATENT DOCUMENTS 10,522,864 B1 * 12/2019 Ryley, III .......... H01M 8/04201
11,564,853 B1 * 1/2023 Delise .................... A61G 3/008
2018/0133074 A1 * 5/2018 Delise .................... B62D 33/02

FOREIGN PATENT DOCUMENTS

CN 112807174 A * 5/2021 ............... A61G 3/00

OTHER PUBLICATIONS

Machine Translation CN112807174A Description accessed Apr. 30, 2026 (Year: 2026).*

* cited by examiner

*Primary Examiner* — Elliot S Ruddie
(74) *Attorney, Agent, or Firm* — Novoclaims Patent Services LLC; Mei Lin Wong

(57) ABSTRACT

A mobile hyperbaric hydrogen-oxygen system is installed into a vehicle having a vehicle cabin and a passenger seat disposed therein. The mobile hyperbaric hydrogen-oxygen system includes a sealed gas container, a gas supplier for supplying a flow of hydrogen gas and a flow of oxygen gas, a supercharger for pressurizing the hydrogen gas and the oxygen gas therein so as to mix the hydrogen gas and the oxygen gas to form a mixed gas, an inhalation mask arranged for being disposed at the passenger seat in a hand-reachable distance, and an air pump operatively connected between the sealed gas container and the inhalation mask for delivering the mixed gas from the sealed gas container to the inhalation mask. Therefore, the passenger sitting at the passenger seat is able to wear the inhalation mask in order to inhale the mixed gas in a controllable manner.

19 Claims, 9 Drawing Sheets

MOBILE HYPERBARIC HYDROGEN-OXYGEN SYSTEM

BACKGROUND OF THE PRESENT INVENTION

Field of Invention

The present invention relates to hyperbaric oxygen therapy, and more particularly to a mobile hyperbaric hydrogen-oxygen system for a vehicle, which is adapted for delivering a mixture of hydrogen and oxygen gas to a passenger during traveling.

Description of Related Arts

Hyperbaric oxygen therapy (HBOT) is the medical use of 100% oxygen at a higher pressure for a user inside a special chamber. Hyperbaric oxygen therapy is widely used in clinical treatment of a variety of acute and chronic diseases such as carbon monoxide poisoning, tetanus infection, gas embolism, decompression sickness, cerebral edema, pulmonary edema, sudden deafness, intrauterine growth retardation, etc. Hyperbaric oxygen therapy also has important clinical significance in rehabilitation.

Tel Aviv University in Israel found that people over 60 who undergo a hyperbaric oxygen therapy for three months looked 25 years younger. High-pressure oxygen with added hydrogen can remove free radicals in the human body. Free radicals are the source of all diseases, so that removing free radicals in the human body is equivalent to treating various diseases of the human body. In addition, the hyperbaric oxygen therapy is considered as a cosmetic treatment that people enjoy the “hyperbaric oxygen spa” to make them younger There are already similar hyperbaric oxygen chambers on the market. However, such hyperbaric oxygen chambers are built in a fixed location, such as hospitals, clinics, or even beauty salons. Users must physically be in the fixed location at a predetermined schedule in order to receive the hyperbaric oxygen treatment. Nowadays, most people spend at least two time a day in a vehicle. It is to the provision of the vehicle to incorporate with a mobile hyperbaric hydrogen-oxygen system for the user to receive the hyperbaric oxygen treatment in the moving vehicle.

SUMMARY OF THE PRESENT INVENTION

The invention is advantageous in that it provides a mobile hyperbaric hydrogen-oxygen system for a vehicle, especially for a ground vehicle, wherein a passenger sitting at a passenger seat is able to inhale a mixed gas of hydrogen and oxygen in a controllable manner.

In order to achieve the above objects, the present invention comprises a mobile hyperbaric hydrogen-oxygen system for a vehicle having a vehicle cabin and at least a passenger seat disposed therein, comprising:

a sealed gas container;

a gas supplier for supplying a flow of hydrogen gas and a flow of oxygen gas, wherein the gas supplier comprises a hydrogen regulating valve controlling an amount of the hydrogen gas to the sealed gas container, and an oxygen regulating valve controlling an amount of the oxygen gas to the sealed gas container;

a supercharger comprising an air output pipe operatively connecting between the supercharger and the sealed gas container, wherein the supercharger is arranged for pressurizing the hydrogen gas and the oxygen gas therein so as to mix the hydrogen gas and the oxygen gas to form a mixed gas;

at least an inhalation mask arranged for being disposed at the passenger seat in a hand-reachable distance; and at least an air pump operatively connected between the sealed gas container and the inhalation mask for delivering the mixed gas from the sealed gas container to the inhalation mask. Therefore, the passenger sitting at the passenger seat is able to wear the inhalation mask in order to inhale the mixed gas in a controllable manner.

Accordingly, the hydrogen regulating valve and the oxygen regulating valve are operated independently to individually open or close the hydrogen regulating valve 203 and the oxygen regulating valve 206 at the same time or at different times. In other words, the passenger can directly inhale hydrogen, directly inhale oxygen, or inhale a mixture of the hydrogen and oxygen gas.

In one embodiment, the supercharger comprises at least an air input pipe having one end operatively connecting to the supercharger and an opposed end arranged for extending out of the vehicle cabin, such that the supercharger is operated for withdrawing fresh air via the air input pipe and for delivering a pressurized air into the sealed gas container.

In one embodiment, by increasing the pressure via the supercharger, the solubility of the mixed gas is increased to enter into the user blood, such that in the presence of high solubility of the mixed gas, tissue cells promote blood circulation and recovery of damaged cells, improve human body functions, and achieve the purpose of treatment.

In one embodiment, at least two air pumps are operatively connected at two opposed sides of the sealed gas container to communicatively connect to two inhalation masks respectively, wherein each of the air pumps is independently operated for delivering the mixed gas from the sealed gas container to the respective inhalation mask.

In one embodiment, a mask storage container is provided for being installed on side of the passenger seat, wherein the inhalation mask is stored in the mask storages when the inhalation mask is not in use.

In one embodiment, a delivering tube is operatively extended from the air pump and a flexible mask hose is detachably coupling the delivering tube with the inhalation mask. Therefore, the inhalation mask can be detached from the delivering tube via the flexible mask hose.

In one embodiment, a limiting frame is provided for coupling at a side of the passenger seat, wherein the delivering tube is guided and retained along the limiting frame to detachably couple with the inhalation mask.

In one embodiment, the mobile hyperbaric hydrogen-oxygen system further comprises a pressure relief assembly which comprises at least one pressure relief pipe operatively connected to the sealed gas container and at least one automatic pressure relief valve operatively connected to the pressure relief pipe. The pressure relief pipe has one end connected to the automatic pressure relief valve and an opposed end arranged for extending out of the vehicle cabin, such that when the automatic pressure relief valve is opened, a pressure of the mixed gas in the sealed gas container is reduced to outside of the vehicle via the pressure relief pipe.

In one embodiment, the pressure relief assembly further comprises a pressure regulating valve operatively connected to the air output pipe and is arranged to perform a real-time detection of the pressure in the sealed gas container. When the gas pressure sensor detects that a pressure value exceeds the preset safety pressure value, the air output pipe is closed via the pressure regulating valve, and the automatic pressure relief valve on the pressure relief pipe is opened at the same time in order to reduce the pressure inside the sealed gas container. At the same time, the mixed gas in the sealed gas container is discharged to the outside of the vehicle through the automatic pressure relief valve.

In one embodiment, the sealed gas container further comprises a gas pressure sensor and a gas concentration detector. The gas pressure sensor is provided at the sealed gas container to monitor a pressure of the mixed gas in the sealed gas container delivered from the gas supplier and pressurized by the supercharger. The gas concentration detector is provided at the sealed gas container to monitor a concentration of the hydrogen gas in the mixed gas in the sealed gas container.

Preferably, the gas pressure sensor has a preset safety pressure value being set below 0.2 MPa. The gas concentration detector has a preset safety concentration value being set below 3.5%. In current medical use, the maximum working pressure of air pressurization is not greater than 0.3 MPa, and the maximum working pressure of oxygen pressurization is not greater than 0.2 MPa. Therefore, it is relatively safe to set the preset safety pressure value of the gas pressure sensor below 0.2 MPa. Another problem is that the intake of hydrogen must overcome the possibility of combustion and explosion when hydrogen and oxygen are mixed. In a pure oxygen environment, hydrogen concentration will not burn or explode if it is less than 4% or more than 94%. The concentration range of combustion in air is 4% to 75%. Therefore, it is safe to intake hydrogen with a concentration of less than 4%.

In one embodiment, the mobile hyperbaric hydrogen-oxygen system further comprises two supporting frames, each having a triangular configuration, mounted at two sides of the sealed gas container respectively for mounting the sealed gas container in the vehicle cabin behind the passenger seats.

Compared to the conventional atomizer, the present invention provides the following advantages:

The passenger is able to receive the treatment during daily transportation time. The advantages of the halation of the mixed gas of hydrogen and oxygen are:

Improve immunity: Since the oxygen content and air pressure of the mixed gas in the sealed air container will be higher than normal air pressure, it can increase the amount of oxygen inhaled by the human body and improve human immunity.

Promote metabolism: The mixed gas in the oxygen in the sealed air container can enhance the body's metabolism, accelerate the body's metabolic process, and help the body burn fat and lose weight.

Enhance cardiopulmonary function: The oxygen content and air pressure of the mixed gas in the sealed air container can increase the body's oxygen intake and promote the circulation of oxygen inside the human body, so as to enhance the cardiopulmonary function and improve the body's physical strength.

Promote skin health: The air pressure of the mixed gas in the sealed air container can stimulate the blood circulation of human skin and promote skin metabolism, so as to improve the skin condition of the human.

Maintain life: The human body needs oxygen to maintain life, and the mixed gas in the sealed air container will make the oxygen in the air denser, which will help the human body absorb more oxygen and maintain the body's normal life activities.

Pain relief: The pressure of the mixed gas in the sealed air container can relieve body pain, promote body recovery, and has a certain relief effect on chronic pain such as arthritis and muscle pain.

To sum up, inhaling the mixed gas in the sealed gas container is beneficial to the human body. It can enhance human immunity, promote human metabolism and health.

People can inhale a certain amount of hydrogen in a short period of time, which can help the brain relieve fatigue, enhance memory, promote sleep, and thereby enhance the body's antioxidant capacity and other functions.

For safety reasons, the mixed gas in the sealed gas container can be discharged to the outside of the vehicle through the two automatic pressure relief valves, such that the air pressure in the sealed gas container remains stable so as to enhance the safety and comfort of the user.

DETAILED DESCRIPTION OF THE PREFERRED EMBODIMENT

Figure 1:
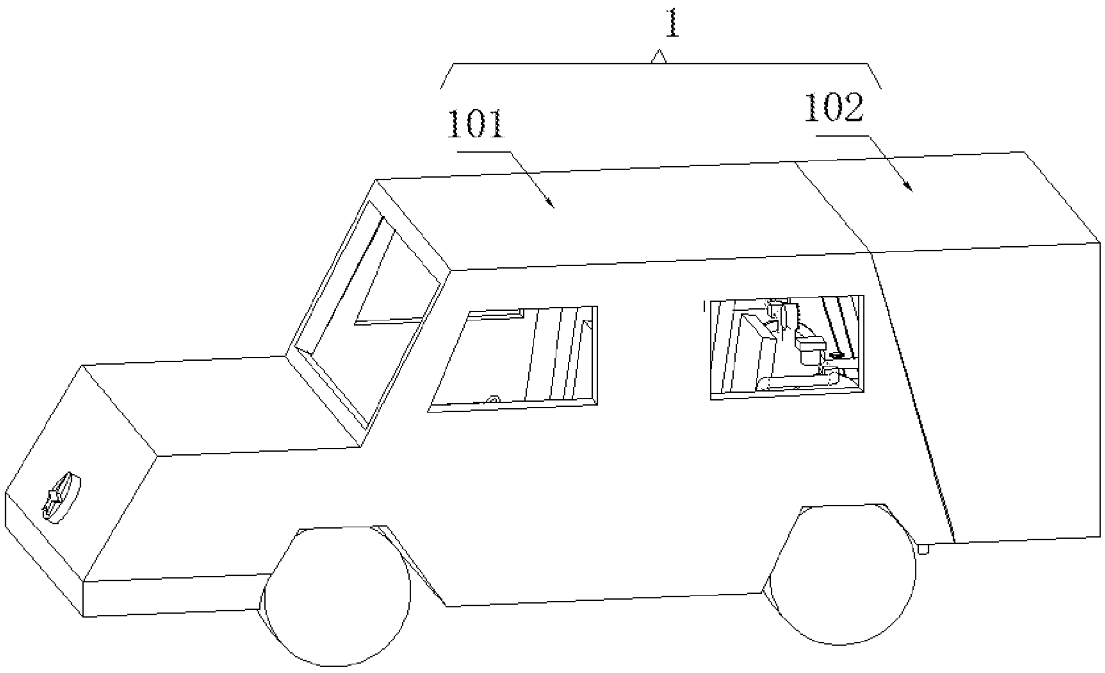
FIG. 1 is a top perspective view of a vehicle incorporating with a mobile hyperbaric hydrogen-oxygen system according to a preferred embodiment of the present invention.
Figure 2:
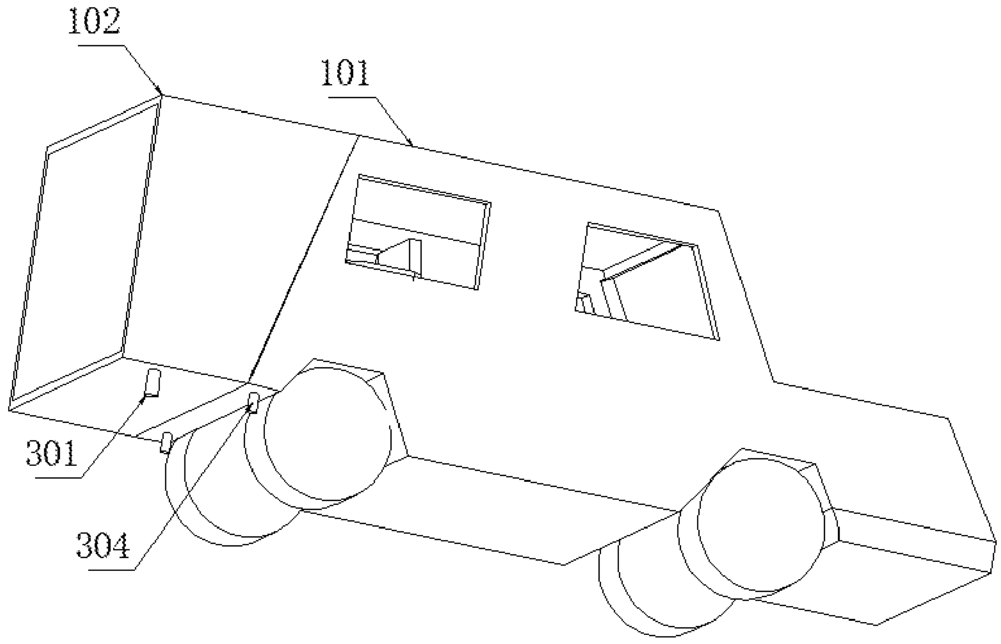
FIG. 2 is a bottom perspective view of the vehicle incorporating with the mobile hyperbaric hydrogen-oxygen system according to the above preferred embodiment of the present invention.

The following description in conjunction with the accompanying drawings is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 9 of the drawings, a mobile hyperbaric hydrogen-oxygen system for a vehicle according to a preferred embodiment is illustrated. Particularly, the mobile hyperbaric hydrogen-oxygen system is incorporated for a ground vehicle, such as a car, a SUV, or a van, wherein the mobile hyperbaric hydrogen-oxygen system is operated for supplying hydrogen and/or oxygen gas for one or more passengers inside the vehicle. In other words, the passenger is able to receive the treatment during daily transportation time.

According to the preferred embodiment, the vehicle 1 has a vehicle cabin 101 and a plurality of passenger seats 103 provided in the vehicle cabin 101. In one embodiment, the passenger seats 103 are positioned side-by-side in the vehicle cabin 101. The mobile hyperbaric hydrogen-oxygen system comprises a hydrogen and oxygen gas production chamber 102 provided in the vehicle cabin 101 and a gas generation mechanism provided in at least one of the passenger seats 103. Preferably, the gas mechanism is provided at each of the passenger seats 103. The gas generation mechanism comprises a gas supplier 2, a supercharger 3, and a sealed gas container 4.

The gas supplier 2 has a hydrogen gas outlet 201 formed at one side of the gas supplier 2 and a hydrogen gas output pipe 202 having one end connected to the hydrogen gas outlet 201 and an opposed end extended into an interior of the sealed gas container 4 through a sealing wall thereof. The gas supplier 2 further has an oxygen gas outlet 204 formed at the side of the gas supplier 2 adjacent to the hydrogen gas outlet 201, and an oxygen gas outlet pipe 205 having one end connected to the oxygen gas outlet 204 and an opposed end extended into the interior of the sealed gas container 4 through the sealing wall thereof. Preferably. The hydrogen gas output pipe 202 and the oxygen gas output pipe 204 are extended side-by-side and are extended parallel to each other.

Preferably, the gas supplier 2 comprises a hydrogen gas container 21 and an oxygen gas container 22, wherein the hydrogen gas outlet 201 and the oxygen gas outlet 204 are operatively connected to the hydrogen gas container 21 and the oxygen gas container 22 respectively. The hydrogen gas container 21 and the oxygen gas container 22 are two refillable gas tanks, such that hydrogen gas and oxygen gas can be stored and refilled into the hydrogen gas container 21 and the oxygen gas container 22 respectively. Alternatively, the gas supplier 2 can be constructed to have a hydrogen gas generator and an oxygen gas generator operatively connected to the hydrogen gas container 21 and the oxygen gas container 22 for generating hydrogen gas and an oxygen gas respectively.

The supercharger 3 comprises at least an air input pipe 301 provided at one side surface of the supercharger 3, a supercharging end 302 provided at an opposed side surface of the supercharger 3, and an air output pipe 303 having one end connected to the supercharging end 302 and an opposed end extended into the interior of the sealed gas container 4 through the sealing wall thereof, wherein the supercharger 3 is arranged for intaking air from the air input pipe 301 and for generating a pressurized air to the sealed gas container 4 through the air output pipe 303 so as to mix the hydrogen gas and the oxygen gas to form the mixed gas in the sealed gas container 4. According to the preferred embodiment, two air input pipes 301 are provided at the side surface of the supercharger 3, wherein intake ends of the air input pipes 301 are extended out of the vehicle cabin 101 for withdrawing fresh air out of the vehicle 1.

Accordingly, the sealed gas container 4 is arranged for discharging the mixed gas into the vehicle cabin 101 in a controllable manner, such that the passenger sitting at passenger seat 103 in the vehicle cabin 101 is able to inhale the mixed gas. It is worth mentioning that once the doors and windows at the vehicle 1 are closed, the vehicle cabin 101 forms an air sealed chamber. Therefore, when the sealed gas container 4 discharges the mixed gas in the vehicle cabin 101, the interior pressure of the vehicle cabin 101 is higher than an exterior pressure of the vehicle cabin 101, such that the passenger is able to directly inhale the mixed gas in the vehicle cabin 101 safety and comfortably.

In order to effectively inhale the mixed gas, the mobile hyperbaric hydrogen-oxygen system further comprises an inhalation assembly provided in the vehicle cabin 101. Through the cooperating operations of the supercharger 3 and the gas supplier 2, hydrogen gas and oxygen gas are delivered into and mixed in the sealed gas container 4 in a controllable manner, such that the mixed hydrogen and oxygen gas in the sealed gas container 4 can be inhaled directly in a safe manner. Preferably, the inhalation assembly comprises an inhalation mask 6 operatively connected to the sealed gas container 4 via a delivering tube 404 and a mask storage container 5 provided adjacent to the passenger seat 103 in a hand reachable distance to store the inhalation mask 6. It is worth mentioning that when two or more inhalation masks 6 are provided for different passengers at different passenger seats 103, the inhalation masks 6 are communicatively connected to the sealed gas container 4 via different delivering tubes 404. Therefore, the passenger sitting at the passenger seats 103 is able to take the inhalation mask 6 out of the mask storage container 5 and wears the inhalation mask 6 to inhale the mixed hydrogen and oxygen gas. It is worth mentioning that the mixed hydrogen and oxygen gas is pressurized to ensure the sufficient purity of oxygen and hydrogen, which can antioxidant capacity of the human body. As a result, the passenger is able to enjoy the "hyperbaric oxygen spa" while sitting in the vehicle 1 during daily transportation time.

Accordingly, the sealed gas container 4 further comprises at least an air pump 403 operatively connected to the sealed gas container 4, wherein the delivering tube 404 is coupled to the air pump 403, such that the air pump 403 is operated to pump the mixed gas in the sealed gas container 4 to the inhalation mask 6 through the delivering tube 404. When two or more delivering tubes 404 are provided, two air pumps 403 are required and are connected at two sides of the sealed gas container 4. It is worth mentioning that each of the air pumps 403 is independently operated for delivering the mixed gas from the sealed gas container 4 to the respective inhalation mask 5. Therefore, the passengers sitting on the passenger seats 103 are able to configure different settings of the air pumps 403.

Figure 4:
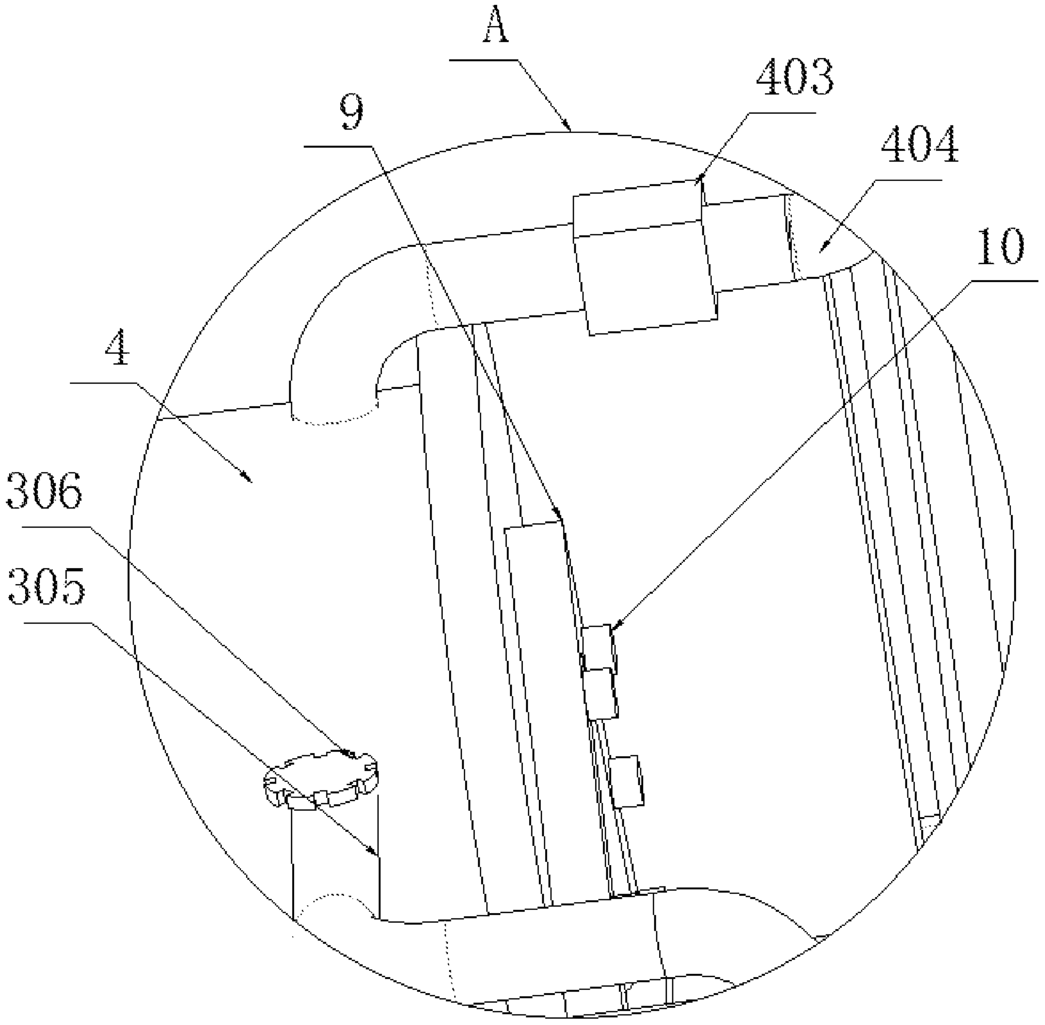
FIG. 4 is an enlarged perspective view of the mobile hyperbaric hydrogen-oxygen system taken in area A in FIG. 3 according to the above preferred embodiment of the present invention.
Figure 5:
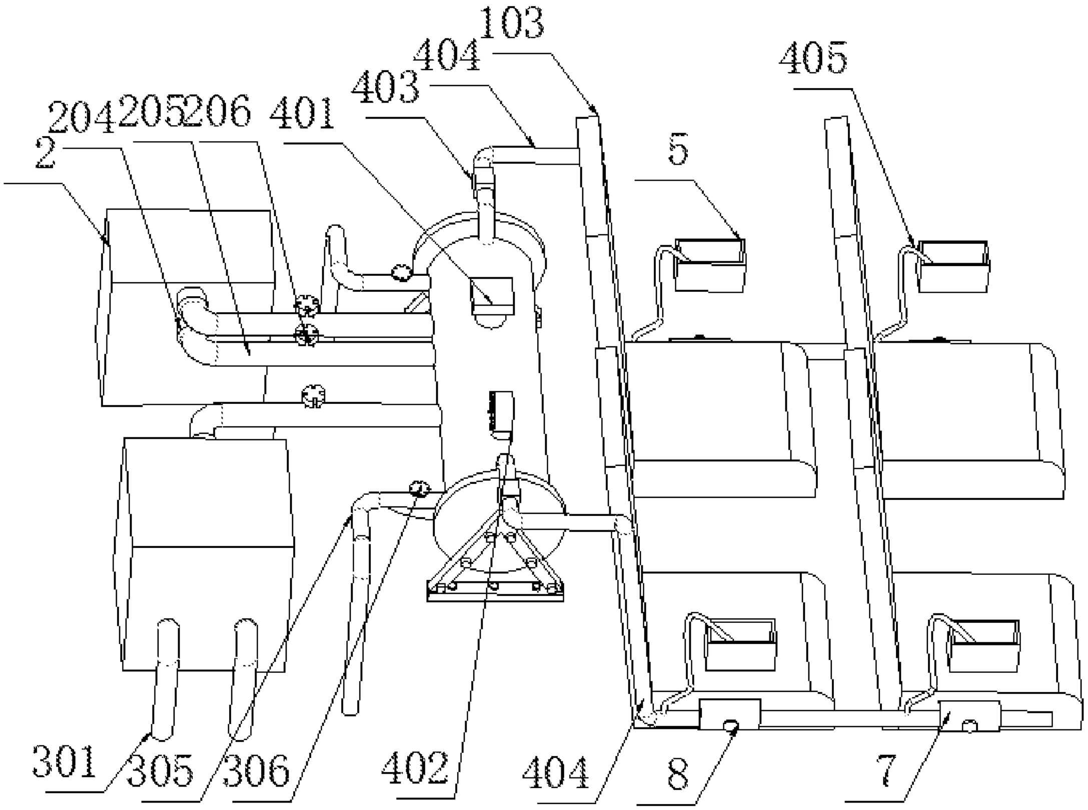
FIG. 5 is perspective view of a gas sealing container of the mobile hyperbaric hydrogen-oxygen system according to the above preferred embodiment of the present invention.
Figure 6:
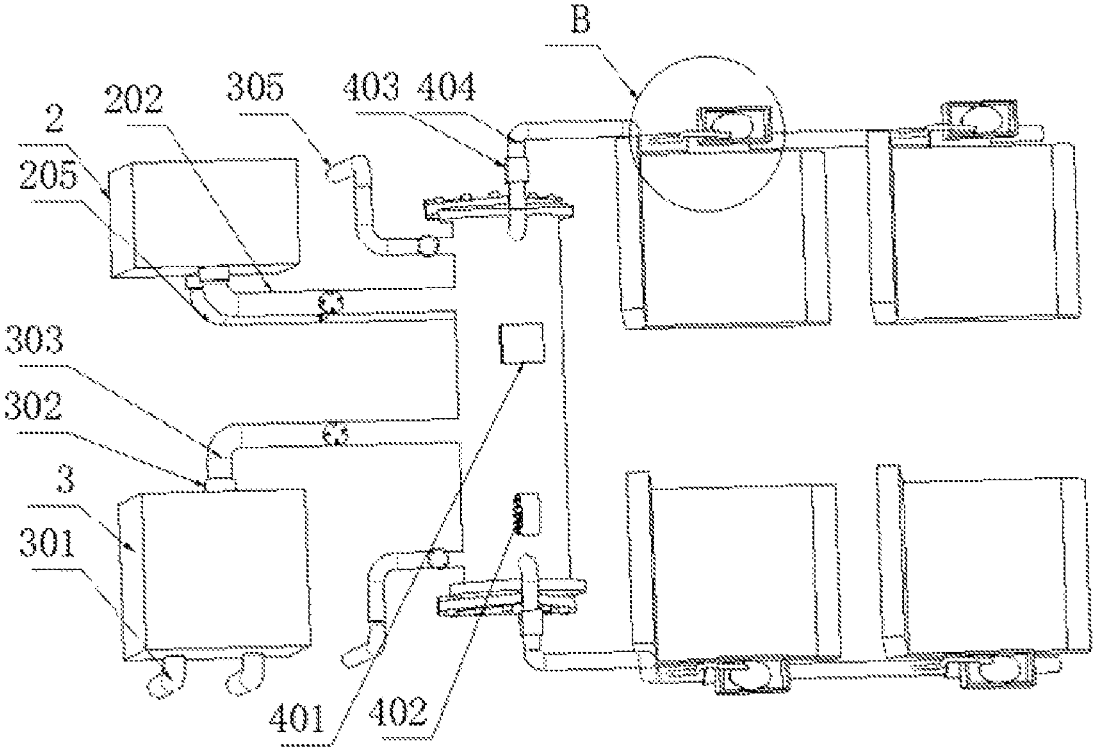
FIG. 6 is a schematic view of the mobile hyperbaric hydrogen-oxygen system in the vehicle cabin according to the above preferred embodiment of the present invention.

As shown in FIGS. 4 to 6, the sealed gas container 4 is made of high-pressure resistant hard materials, which can withstand high pressurized gas in the sealed gas container 4 in order to increase the service life span thereof. The sealed gas container 4 comprises a gas pressure sensor 401 and a gas concentration detector 402 provided at the sealed gas container 4, wherein the gas pressure sensor 401 and the gas concentration detector 402 are provided adjacent to each other. The gas pressure sensor 401 has a preset safety pressure value being set below 0.2 MPa. The gas concentration detector 402 has a preset safety concentration value being set below 3.5%. In current medical use, the pressurized medium of the hyperbaric oxygen chamber is air or medical oxygen. The maximum working pressure of air pressurization is not greater than 0.3 MPa, and the maximum working pressure of oxygen pressurization is not greater than 0.2 MPa. Therefore, it is relatively safe to set the preset safety pressure value of the gas pressure sensor 401 below 0.2 MPa. Another problem is that the intake of hydrogen must overcome the possibility of combustion and explosion when hydrogen and oxygen are mixed. In a pure oxygen environment, hydrogen concentration will not burn or explode if it is less than 4% or more than 94%. The concentration range of combustion in air is 4% to 75%. Therefore, it is safe to intake hydrogen with a concentration of less than 4%.

Figure 3:
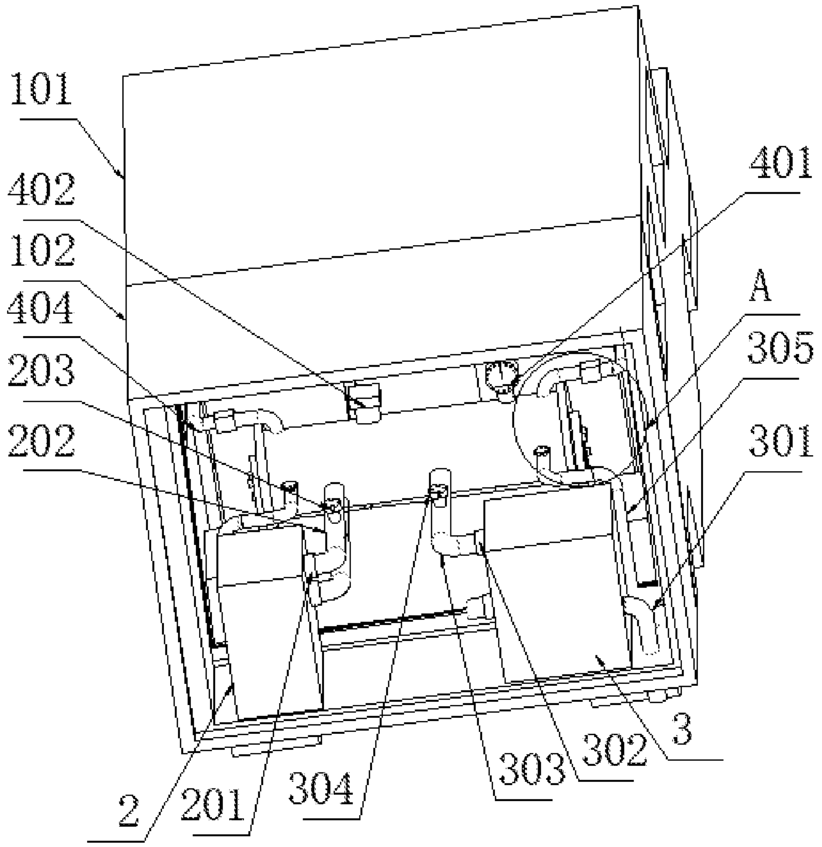
FIG. 3 is a perspective view of the mobile hyperbaric hydrogen-oxygen system according to the above preferred embodiment of the present invention.

As shown in FIGS. 3 and 5, the gas pressure sensor 401 provided at the sealed gas container 4 is arranged to monitor the pressure of the mixed hydrogen and oxygen gas in the sealed gas container 4 delivered from the gas supplier 2 and pressurized by the supercharger 3. Likewise, the gas concentration detector 402 provided at the sealed gas container 4 is arranged to monitor the concentration of the hydrogen gas in the mixed hydrogen and oxygen gas in the sealed gas container 4 delivered from the gas supplier 2 and pressurized by the supercharger 3.

The gas supplier 2 further comprises a hydrogen regulating valve 203 operatively provided at the hydrogen gas output pipe 202 for controlling an amount of the hydrogen gas to the sealed gas container 4, and an oxygen regulating valve 206 operatively provided at the oxygen gas output pipe 205 for controlling an amount of the oxygen gas to the sealed gas container 4. Through the gas pressure sensor 401, the hydrogen regulating valve 203 is operatively regulated to control the concentration of hydrogen gas being delivered from the gas supplier 2 to the sealed gas container 4 in order to mix with the oxygen gas therein to form the mixed hydrogen and oxygen gas. The gas concentration detector 402 can detect the hydrogen concentration in the sealed gas container 4. During the operation of the gas concentration detector 402, the hydrogen concentration can also be adjusted through the hydrogen regulating valve 203 to prevent an explosion due to excessive hydrogen concentration so as to improve the safety of the sealed gas container 4. As a result, people can inhale a certain amount of hydrogen in a short period of time, which can help the brain relieve fatigue, enhance memory, promote sleep, and thereby enhance the body's antioxidant capacity and other functions.

The mobile hyperbaric hydrogen-oxygen system further comprises a pressure relief assembly which comprises at least one pressure relief pipe 305 operatively connected to the sealed gas container 4 and at least one automatic pressure relief valve 306 operatively connected to the pressure relief pipe 305. Preferably, two pressure relief pipes 305 are operatively connected to the sealed gas container 4 and two automatic pressure relief valves 306 are operatively connected to the pressure relief pipes 305 respectively. Preferably, the two pressure relief pipes 305 are connected to two opposed sides of the sealed gas container 4, and are communicated with the gas pressure sensor 401. Accordingly, one end of the pressure relief pipe 305 is connected to the automatic pressure relief valve 306 and is further extended into the interior of the sealed gas container 4. An opposed end of the pressure relief pipe 305 is extended out of the vehicle 1.

The pressure relief assembly further comprises a pressure regulating valve 304 operatively connected to the air output pipe 303 for controlling the pressure of the air input into the sealed gas container 4. The gas pressure sensor 401 performs real-time detection of gas pressure in the sealed gas container 4. When the gas pressure sensor 401 detects that the pressure value exceeds the preset safety pressure value, the air output pipe 303 can be closed via the pressure regulating valve 304, and the automatic pressure relief valves 306 on the two pressure relief pipes 305 can be opened at the same time in order to reduce the pressure inside the sealed gas container 4. At the same time, the mixed gas in the sealed gas container 4 can be discharged to the outside of the vehicle 1 through the two automatic pressure relief valves 306, such that the air pressure in the sealed gas container 4 remains stable so as to enhance the safety and comfort of the user.

Figure 7:
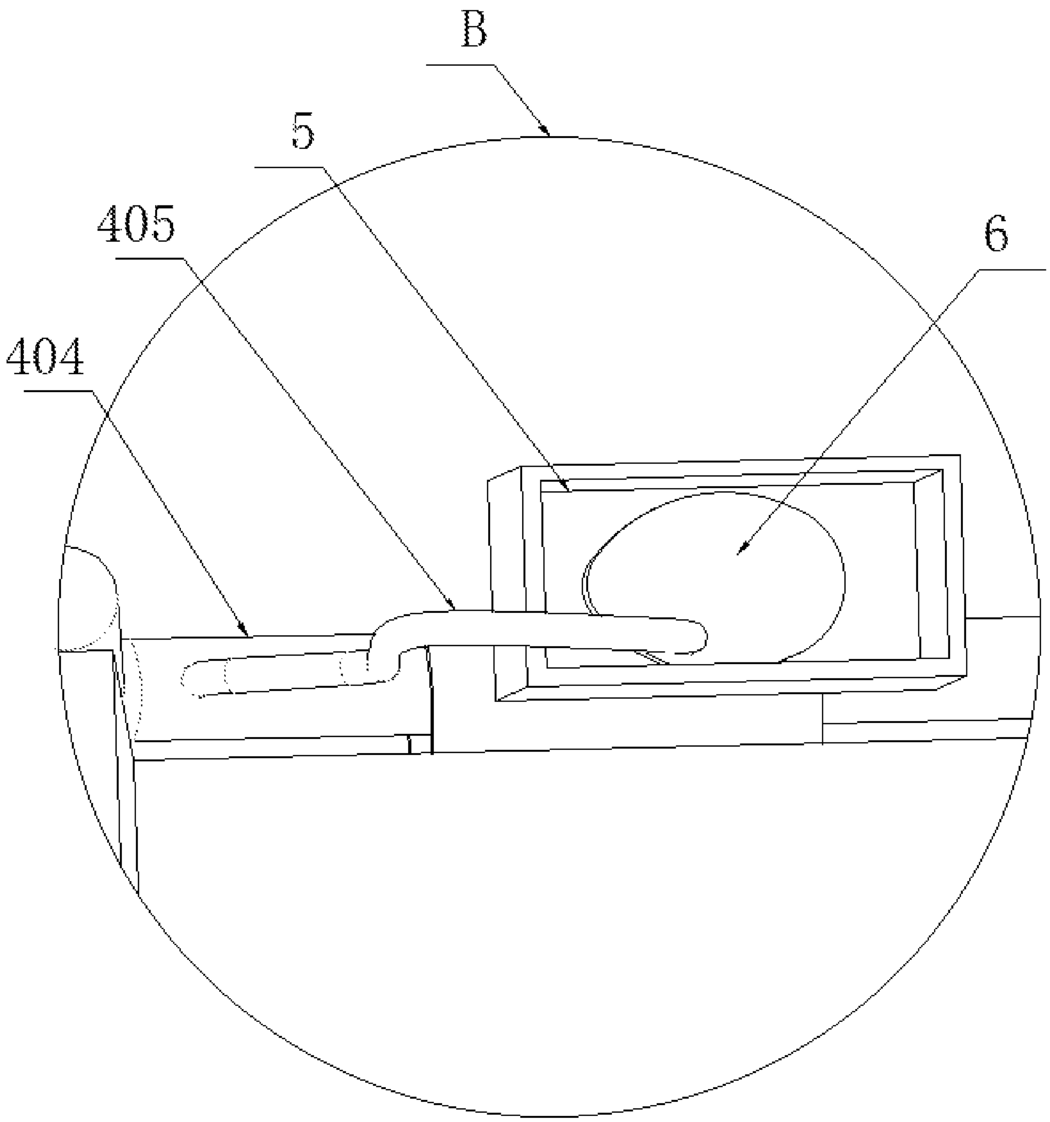
FIG. 7 is an enlarged perspective view of the mobile hyperbaric hydrogen-oxygen system taken in area B in FIG. 6 according to the above preferred embodiment of the present invention.
Figure 8:
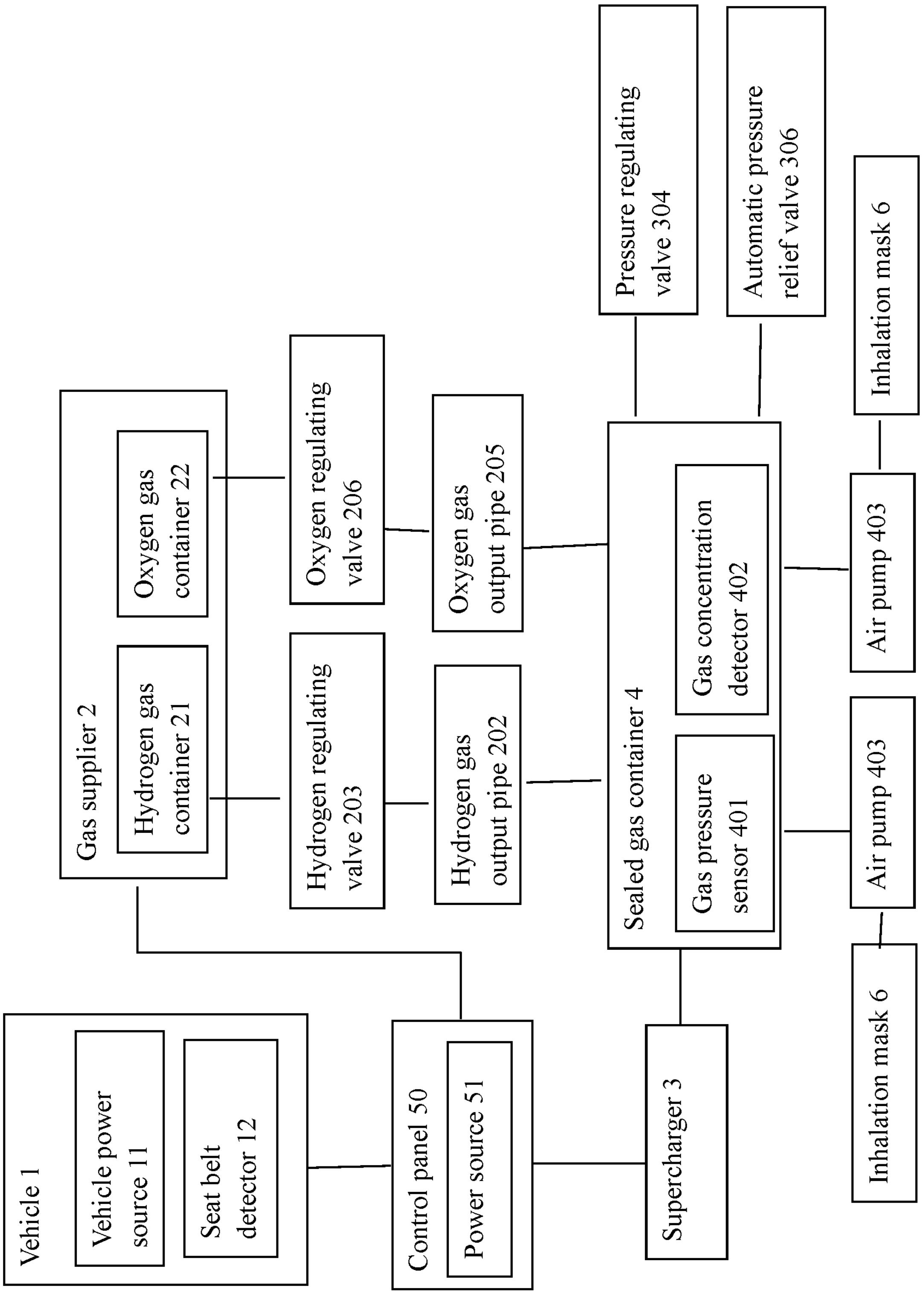
FIG. 8 is a block diagram of the mobile hyperbaric hydrogen-oxygen system according to the above preferred embodiment of the present invention.

As shown in FIGS. 6 and 7, the mask storage container 5 is installed on one side of each of the passenger seats 103, preferably under an arm rest of each of the passenger seats 103, wherein the inhalation mask 6 detachably connected to the sealed gas container 4 via the delivering tube 404. The inhalation mask 6 is saved and stored in the mask storage container 5 when the inhalation mask 6 is not in use so as to prevent any damage of the inhalation mask 6. Accordingly, the inhalation mask 6 is a disposable mask for one time use, such that the inhalation mask 6 must be disposed after use and replaced by a new inhalation mask 6 for the next use.

As shown in FIG. 5, the mobile hyperbaric hydrogen-oxygen system further comprises a supporting structure for supporting the sealed gas container 4 at the vehicle cabin 101. In one embodiment, the supporting structure comprises two supporting frames 9, each having a triangular configuration, mounted at two sides of the sealed gas container 4. One end of each of the supporting frames 9 is mounted at the corresponding side of the sealed gas container 4 via mounting tools 10 such as mounting bolts. Bases of the supporting frames 9 are mounted at the vehicle cabin 101 via the mounting tools 10 in order to mount the sealed air container 4 behind of the passenger seat 103. Via the triangular configuration of the supporting frame 9, the supporting structure provides excellent support and stability for the sealed gas container 4. The supporting structure further comprises a limiting frame 7 coupled at one side of the passenger seat 103. Particularly, the delivering tube 404 is extended from the sealed gas container 4 to the inhalation mask 6 along the limiting frame 7, wherein the delivering tube 404 is guided to extended along the limiting frame 7 is retained at the limiting frame 7 via a fixing tool 8, such as a fixing bolt. In other words, the delivering tube 404 is guided to extend along the limiting frame 7 at the side of the passenger seat 103 and is retained by the fixing tool 8 so as to ensure the delivering tube 404 being stably and securely connected to the inhalation mask 6.

According to the preferred embodiment, the mobile hyperbaric hydrogen-oxygen system further comprises a control panel 50 operatively connecting to the gas supplier 2, the supercharger 3, and the air pumps 403 to control operations thereof so as to regulate the amounts of the hydrogen gas and the oxygen gas to be mixed and inhaled. Accordingly, the control panel 50 is arranged for electrically connecting to a vehicle power source 11 of the vehicle 1. Preferably, the control panel 50 comprises a self-power source 51 for supplying electrical power to the gas supplier 2, the supercharger 3, and the air pumps 403.

Figure 9:
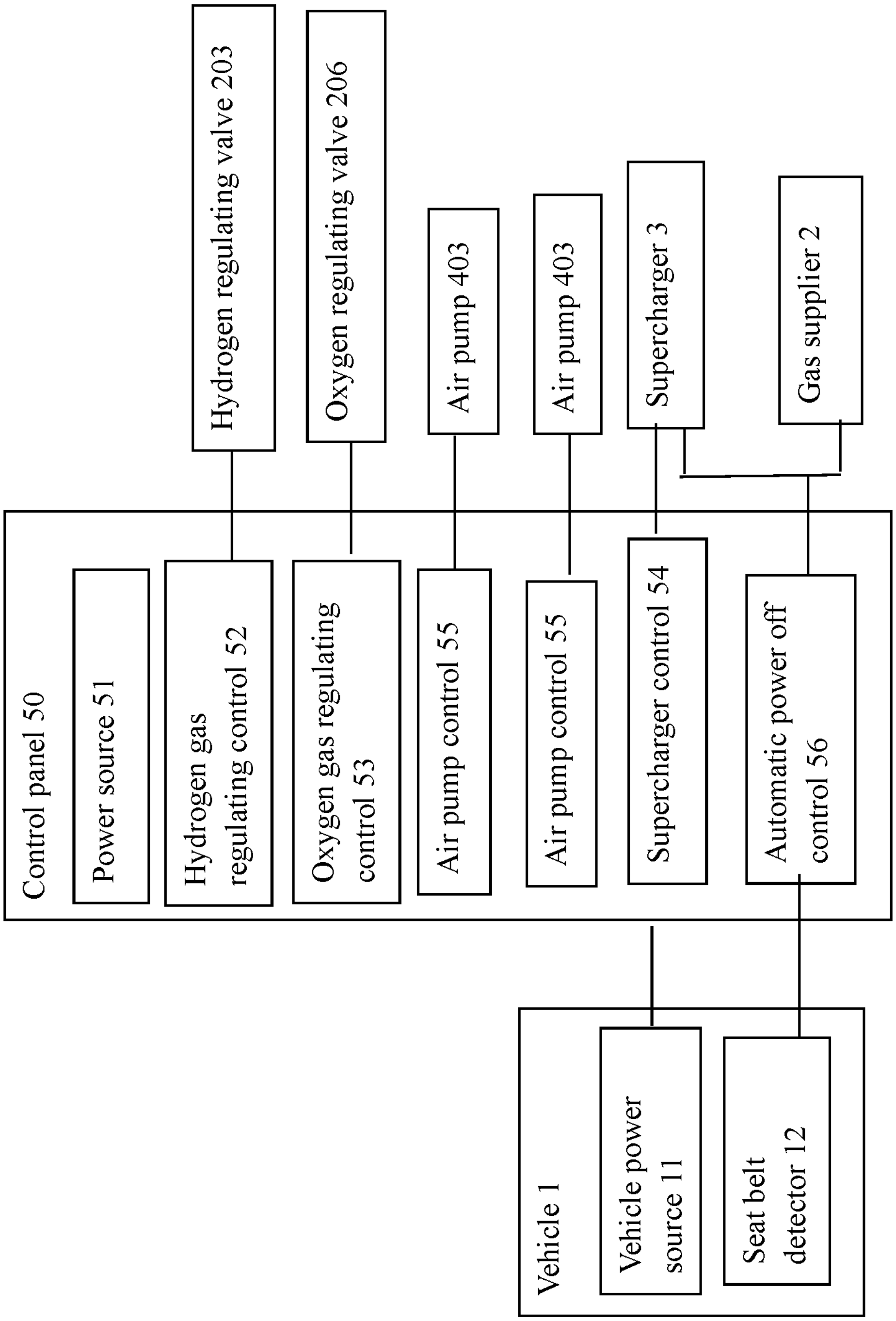
FIG. 9 is a block diagram of a control panel of the mobile hyperbaric hydrogen-oxygen system according to the above preferred embodiment of the present invention.

As shown in FIG. 9, the control panel 50 comprises a plurality of controls for controlling operations of different components. Particularly, the control panel 50 comprises a hydrogen gas regulating control 52 operatively connected to the hydrogen regulating valve 203 for regulating the concentration of the hydrogen gas delivering to the sealed gas container 4, an oxygen gas regulating control 53 operatively connected to the oxygen regulating valve 206 for regulating the amount of oxygen gas delivering to the sealed gas container 4, a supercharger control 54 operatively connected to the supercharger 3 for regulating the pressure of the sealed gas container 4, and at least an air pump control 55 operatively connected to the air pump 403 to regulate a power of the air pump 403 for regulating a flow rate of the mixed gas delivering to the inhalation mask 5. Preferably, two air pump controls 55 are operatively connected to the air pumps 403 to regulate powers of the air pumps 403 for regulating the flow rates of the mixed gas delivering to the inhalation masks 5 respectively. Therefore, each passenger is able to control the flow rate of the mixed gas via its own air pump control 55. It is worth mentioning that that the passenger is able to further set the operation time of the mobile hyperbaric hydrogen-oxygen system via the control panel 50. For example, the passenger is able to set 10 minute inhaling time.

For safety purposes, the control panel 50 comprises an automatic power off control 56 operatively connecting to each of the air pumps 403 to shut off the powers thereof. Accordingly, the automatic power off device 56 is arranged for communicatively connecting to a seatbelt detector 12 of the vehicle 1 and is arranged in such a manner that the air pump 403 is automatically shut off when a seatbelt of the respective passenger seat 103 is not fastened. In other words, the air pump 403 will not be operated when the passenger does not fasten his or her seatbelt.

The working principle of the present invention: when the vehicle 1 is moving, i.e. a driver drives the vehicle, the doors and windows at the vehicle 1 are closed, such that the vehicle cabin 101 is in a sealed condition. It should be noted that the doors and windows of the vehicle 1 are made of materials to provide an excellent sealing effect.

When the passenger wants to enjoy the "hyperbaric oxygen spa", he or she is able to wear the inhalation mask 6 for inhaling the hyperbaric oxygen and hydrogen gas once the seatbelt is fastened. The hyperbaric oxygen and hydrogen gas, i.e. the mixed gas in the sealed gas container 4, is created by switching on the air supplier 2 and the supercharger 3, wherein the supercharger 3 is operated for sucking the air, i.e. fresh air, from an exterior of the vehicle 1 via the air input pipes 301 and for pressurizing the air to the sealed gas container 4. Then, the pressurized gas is introduced into the sealed gas container 4 via the air output pipe 303 at the supercharging end 302. At this point, the supercharging end 302 of the supercharger 3 is able to pressurize the vehicle cabin 101 to ensure the normal gas inhalation. At the same time, the hydrogen regulating valve 203 is opened, wherein the gas supplier 2 simultaneously supplies the hydrogen gas into the sealed gas container 4 through the hydrogen gas outlet pipe 202 at the hydrogen gas outlet 201. The oxygen regulating valve 206 is opened, wherein the gas supplier 2 simultaneously supplies the oxygen into the sealed gas container 4 through the oxygen gas outlet pipe 205 at the oxygen gas outlet 204. It is worth mentioning that the hydrogen regulating valve 203 and the oxygen regulating valve 206 can be opened at the same time or individually. In other words, the passenger can directly inhale hydrogen, directly inhale oxygen, or inhale a mixture of the hydrogen and oxygen gas.

At this moment, the air pump 403 at the sealed gas container 4 is switched on. The input end of the air pump 403 simultaneously pumps the mixed gas inside the sealed gas container 4 to the delivering tube 404. It is worth mentioning that one end of the delivering tube 404 is connected to the air pump 403 and an opposed end of the delivering tube 404 is detachably connected to the inhalation mask 6 via a flexible mask hose 405, so as to deliver the mixed gas from the sealed gas container 4 to the inhalation mask 6 in a sealed manner. The passenger sitting on the passenger seat 103 in the vehicle cabin 1 is able to take out the inhalation mask 6 from the mask storage container 5 and wear the inhalation mask 6 on his or her face to inhale the mixed gas directly as normal breathing. Preferably, the inhalation mask 6 is a full face mask. Because of high solubility, hydrogen and oxygen can be input into the blood. In the presence of high-dissolution hydrogen and oxygen, tissue cells can promote blood circulation and the recovery of damaged cells, improve human body functions and achieve therapeutic purposes.

When the hydrogen gas and the oxygen gas are continuously input and mixed in the sealed gas container 4, the gas pressure sensor 401 detects the gas pressure in the sealed gas container 4 in a real time manner. When gas pressure sensor 401 detects that the pressure value exceeds the preset safety pressure value, the air output pipe 303 can be closed through the pressure regulating valve 304. At the same time, the automatic pressure relief valves 306 on the two pressure relief pipes 305 are opened currently to release the mixed gas in the sealed gas container 4, so as to reduce the pressure therein. As a result, the mixed gas in the sealed gas container 4 can be discharged to the outside of the vehicle 1 through the two automatic pressure relief valves 306, such that the air pressure in the sealed gas container 4 will remain stable to enhance the safety and comfort of the user.

Finally, during the use of the sealed gas container 4, the gas concentration detector 402 can detect the hydrogen concentration in the sealed gas container 4. During the operation of the gas concentration detector 402, the hydrogen concentration can also be adjusted through the hydrogen regulating valve 203 to prevent an explosion due to excessive hydrogen concentration so as to enhance the safety of the sealed gas container 4. Therefore, the passenger can inhale a certain amount of hydrogen in a short period of time to help the brain relieve fatigue, enhance memory, promote sleep, and thereby enhance the body's antioxidant capacity and other functions.

It shall be understood that when an element is referred to as being "connected to" or "coupled to" another element, the initial element may be directly connected to, or coupled to, another element, or to other intervening elements. It is appreciated that the terms "up", "down", "left", "right", etc. are only used to express relative positional relationships. When the absolute position of the element changes, the relative positional relationship may change.

One skilled in the art will understand that the embodiment of the present invention as shown in the drawings and described above is exemplary only and not intended to be limiting. Therefore, this invention includes all modifications encompassed within the spirit and scope of the following claims.

What is claimed is:

1. A mobile hyperbaric hydrogen-oxygen system for a vehicle having a vehicle cabin and at least two passenger seats disposed therein side-by-side, comprising: a sealed gas container; a gas supplier for supplying a flow of hydrogen gas and a flow of oxygen gas, wherein the gas supplier comprises a hydrogen regulating valve controlling an amount of the hydrogen gas to the sealed gas container, and an oxygen regulating valve controlling an amount of the oxygen gas to the sealed gas container; and a supercharger comprising an air output pipe operatively connecting between the supercharger and the sealed gas container, wherein the supercharger is arranged for pressurizing the hydrogen gas and the oxygen gas therein so as to mix the hydrogen gas and the oxygen gas to form a mixed gas in the sealed gas container, wherein the sealed gas container is arranged for discharging the mixed gas into the vehicle cabin; thereby, a passenger sitting at the passenger seat is able to inhale the mixed gas in the vehicle cabin in a controllable manner, and at least an inhalation mask arranged for being respectively disposed at the passenger seats in a hand-reachable distance; and at least an air pump operatively connected between the sealed gas container and the inhalation mask to deliver the mixed gas from the sealed gas container to the inhalation mask for enabling the passenger sitting at the passenger seat to wear the inhalation mask in order to inhale the mixed gas in a controllable manner.

2. The mobile hyperbaric hydrogen-oxygen system, as recited in claim 1, wherein the gas supplier comprises a hydrogen gas container for storing the hydrogen gas, a hydrogen gas output pipe operatively extended from the hydrogen gas container to the sealed gas container, an oxygen gas container for storing the oxygen gas, and an oxygen gas output pipe operatively extended from the oxygen gas container to the sealed gas container, wherein the hydrogen regulating valve and the oxygen regulating valve is operatively coupled at the hydrogen gas output pipe and the oxygen gas output pipe respectively.

3. The mobile hyperbaric hydrogen-oxygen system, as recited in claim 1, wherein the supercharger comprises at least an air input pipe having one end operatively connecting to the supercharger and an opposed end arranged for extending out of the vehicle cabin, such that the supercharger is operated for withdrawing fresh air via the air input pipe and for delivering a pressurized air into the sealed gas container.

4. The mobile hyperbaric hydrogen-oxygen system, as recited in claim 1, further comprising a delivering tube operatively extended from the air pump and a flexible mask hose detachably coupling the delivering tube with the inhalation mask.

5. The mobile hyperbaric hydrogen-oxygen system, as recited in claim 4, further comprising a limiting frame arranged for coupling at a side of the passenger seat, wherein the delivering tube is guided and retained along the limiting frame to detachably couple with the inhalation mask.

6. The mobile hyperbaric hydrogen-oxygen system, as recited in claim 1, further comprising two supporting frames, each having a triangular configuration, mounted at two sides of the sealed gas container respectively for mounting the sealed gas container in the vehicle cabin behind the passenger seat.

7. The mobile hyperbaric hydrogen-oxygen system, as recited in claim 1, further comprising a pressure relief assembly which comprises at least one pressure relief pipe operatively connected to the sealed gas container and at least one automatic pressure relief valve operatively connected to the pressure relief pipe, wherein the pressure relief pipe has one end connected to the automatic pressure relief valve and an opposed end arranged for extending out of the vehicle cabin, such that when the automatic pressure relief valve is opened, a pressure of the mixed gas in the sealed gas container is reduced to outside of the vehicle via the pressure relief pipe.

8. The mobile hyperbaric hydrogen-oxygen system, as recited in claim 7, wherein the pressure relief assembly further comprises a pressure regulating valve operatively connected to the air output pipe and is arranged to perform a real-time detection of the pressure in the sealed gas container, wherein when the gas pressure sensor detects that a pressure value exceeds the preset safety pressure value, the air output pipe is closed via the pressure regulating valve, and the automatic pressure relief valve on the pressure relief pipe is opened at the same time in order to reduce the pressure inside the sealed gas container, wherein, at the same time, the mixed gas in the sealed gas container is discharged to the outside of the vehicle through the automatic pressure relief valve.

9. The mobile hyperbaric hydrogen-oxygen system, as recited in claim 1, wherein the sealed gas container comprises a gas pressure sensor provided at the sealed gas container to monitor a pressure of the mixed gas in the sealed gas container delivered from the gas supplier and pressurized by the supercharger, and a gas concentration detector provided at the sealed gas container to monitor a concentration of the hydrogen gas in the mixed gas in the sealed gas container.

10. The mobile hyperbaric hydrogen-oxygen system, as recited in claim 9, wherein the gas pressure sensor has a preset safety pressure value being set below 0.2 MPa, wherein the gas concentration detector has a preset safety concentration value being set below 3.5%.

11. The mobile hyperbaric hydrogen-oxygen system, as recited in claim 1, further comprising a mask storage container adapted for being installed on a side of the passenger seat, wherein the inhalation mask is stored in the mask storage when the inhalation mask is not in use.

12. The mobile hyperbaric hydrogen-oxygen system, as recited in claim 1, further comprising a control panel operatively connecting to the gas supplier, the supercharger, and the air pump to control operations thereof so as to regulate the amounts of the hydrogen gas and the oxygen gas to be mixed and inhaled, wherein the control panel is arranged for electrically connecting to a power source of the vehicle.

13. The mobile hyperbaric hydrogen-oxygen system, as recited in claim 12, wherein the control panel comprises a hydrogen gas regulating control operatively connected to the hydrogen regulating valve for regulating a concentration of the hydrogen gas delivering to the sealed gas container, an oxygen gas regulating control operatively connected to the oxygen regulating valve for regulating the amount of oxygen gas delivering to the sealed gas container, and an air pump control operatively connected to the air pump to regulate a power of the air pump for regulating a flow rate of the mixed gas delivering to the inhalation mask.

14. The mobile hyperbaric hydrogen-oxygen system, as recited in claim 13, wherein the control panel comprises an automatic power off control operatively connecting to each of the air pumps, wherein the automatic power off device is arranged for communicatively connecting to a seatbelt detector of the vehicle and arranged in such a manner that the air pump is automatically shut off when a seatbelt of the respective passenger seat is not fastened.

15. A mobile hyperbaric hydrogen-oxygen system for a vehicle having a vehicle cabin and at least two passenger seats disposed therein side-by-side, comprising:

a sealed gas container;

a gas supplier for supplying a flow of hydrogen gas and a flow of oxygen gas, wherein the gas supplier comprises a hydrogen regulating valve controlling an amount of the hydrogen gas to the sealed gas container, and an oxygen regulating valve controlling an amount of the oxygen gas to the sealed gas container;

a supercharger comprising an air output pipe operatively connecting between the supercharger and the sealed gas container, wherein the supercharger is arranged for pressurizing the hydrogen gas and the oxygen gas therein so as to mix the hydrogen gas and the oxygen gas to form a mixed gas;

at least two inhalation masks arranged for being respectively disposed at the passenger seats in a hand-reachable distance;

at least two air pumps operatively connected between the sealed gas container and the inhalation masks respectively, wherein each of the air pumps is independently operated for delivering the mixed gas from the sealed gas container to the respective inhalation mask;

two delivering tubes operatively extended from the air pumps respectively;

two flexible mask hoses detachably coupling the delivering tubes with the inhalation masks respectively; and two limiting frames arranged for coupling at sides of the passenger seats respectively, wherein the delivering tubes are guided and retained along the limiting frames to detachably couple with the inhalation masks respectively;

thereby, a passenger sitting at the passenger seat is able to wear the inhalation mask in order to inhale the mixed gas in a controllable manner.

16. The mobile hyperbaric hydrogen-oxygen system, as recited in claim 15, further comprising a pressure relief assembly which comprises at least one pressure relief pipe operatively connected to the sealed gas container and at least one automatic pressure relief valve operatively connected to the pressure relief pipe, wherein the pressure relief pipe has one end connected to the automatic pressure relief valve and an opposed end arranged for extending out of the vehicle cabin, such that when the automatic pressure relief valve is opened, a pressure of the mixed gas in the sealed gas container is reduced to outside of the vehicle via the pressure relief pipe.

17. The mobile hyperbaric hydrogen-oxygen system, as recited in claim 16, wherein the pressure relief assembly further comprises a pressure regulating valve operatively connected to the air output pipe and is arranged to perform a real-time detection of the pressure in the sealed gas container, wherein when the gas pressure sensor detects that a pressure value exceeds the preset safety pressure value, the air output pipe is closed via the pressure regulating valve, and the automatic pressure relief valve on the pressure relief pipe is opened at the same time in order to reduce the pressure inside the sealed gas container, wherein, at the same time, the mixed gas in the sealed gas container is discharged to the outside of the vehicle through the automatic pressure relief valve.

18. The mobile hyperbaric hydrogen-oxygen system, as recited in claim 17, wherein the sealed gas container comprises a gas pressure sensor provided at the sealed gas container to monitor a pressure of the mixed gas in the sealed gas container delivered from the gas supplier and pressurized by the supercharger, and a gas concentration detector provided at the sealed gas container to monitor a concentration of the hydrogen gas in the mixed gas in the sealed gas container, wherein the gas pressure sensor has a preset safety pressure value being set below 0.2 MPa, wherein the gas concentration detector has a preset safety concentration value being set below 3.5%.

19. The mobile hyperbaric hydrogen-oxygen system, as recited in claim 18, further comprising a control panel operatively connecting to the gas supplier, the supercharger, and the air pumps to control operations thereof, wherein the control panel comprises:

a hydrogen gas regulating control operatively connected to the hydrogen regulating valve for regulating a concentration of the hydrogen gas delivering to the sealed gas container;

an oxygen gas regulating control operatively connected to the oxygen regulating valve for regulating the amount of oxygen gas delivering to the sealed gas container;

two air pump controls operatively connected to the air pumps to regulate powers of the air pumps for regulating flow rates of the mixed gas delivering to the inhalation masks respectively; and an automatic power off control operatively connecting to each of the air pumps, wherein the automatic power off device is arranged for communicatively connecting to a seatbelt detector of the vehicle and arranged in such a manner that the air pump is automatically shut off when a seatbelt of the respective passenger seat is not fastened.

* * * * *